United States Patent

Nagayama et al.

(10) Patent No.: US 6,935,139 B2
(45) Date of Patent: Aug. 30, 2005

(54) METHOD OF MANUFACTURING OPTICAL FIBER

(75) Inventors: Katsuya Nagayama, Yokohama (JP); Kazuya Kuwahara, Yokohama (JP); Takayuki Shimazu, Yokohama (JP)

(73) Assignee: Sumitomo Electric Industries, Osaka (JP)

( * ) Notice: Subject to any disclaimer, the term of this patent is extended or adjusted under 35 U.S.C. 154(b) by 435 days.

(21) Appl. No.: 10/143,925

(22) Filed: May 14, 2002

(65) Prior Publication Data

US 2002/0194881 A1 Dec. 26, 2002

(30) Foreign Application Priority Data

May 14, 2001 (JP) ..................................... P2001-143498

(51) Int. Cl.[7] ............................................. C03B 37/027
(52) U.S. Cl. ............................ 65/435; 65/381; 65/382; 65/424; 65/510; 264/1.24
(58) Field of Search .......................... 65/381, 382, 384, 65/424, 430, 431, 432, 435, 447, 475, 477, 488, 491, 507, 509, 510, 513, 529, 530, 533, 537, 538, 187; 264/1.24, 2.6, 2.7; 385/123–128, 141–145

(56) References Cited

U.S. PATENT DOCUMENTS

| | | | | |
|---|---|---|---|---|
| 4,566,754 A | * | 1/1986 | Beales et al. ................ | 385/123 |
| 4,673,427 A | * | 6/1987 | Van Der Giessen et al. .. | 65/424 |
| 5,284,499 A | * | 2/1994 | Harvey et al. ................. | 65/435 |
| 6,576,164 B2 | * | 6/2003 | Guenot et al. ............. | 264/1.24 |
| 6,715,323 B1 | * | 4/2004 | Roba et al. .................... | 65/434 |
| 6,829,911 B2 | * | 12/2004 | Davis et al. ................... | 65/377 |
| 2002/0178762 A1 | * | 12/2002 | Foster et al. ................... | 65/424 |
| 2003/0200772 A1 | * | 10/2003 | Foster et al. ................... | 65/424 |

FOREIGN PATENT DOCUMENTS

| | | |
|---|---|---|
| JP | 61-147233 | 9/1986 |
| JP | 4-198036 | 7/1992 |
| JP | 6-2603 | 1/1994 |
| JP | 8-9490 | 1/1996 |

* cited by examiner

*Primary Examiner*—Eric Hug
(74) *Attorney, Agent, or Firm*—McDermott Will & Emery LLP

(57) ABSTRACT

The method of manufacturing an optical fiber in accordance with the present invention comprises a step of yielding an optical fiber by drawing an optical fiber preform softened upon heating, wherein a temperature at which the optical fiber preform is softened is at least 1800° C., whereas the optical fiber preform or optical fiber has a glass cooling rate of 4000° C./sec or less when attaining a temperature of 1800° C.

2 Claims, 2 Drawing Sheets

METHOD OF MANUFACTURING OPTICAL FIBER

BACKGROUND OF THE INVENTION

1. Field of the Invention

The present invention relates to a method of manufacturing an optical fiber; and, more specifically, to a method of manufacturing an optical fiber in which an optical fiber preform is drawn while being softened upon heating.

2. Related Background Art

Optical fibers have been employed in communication lines since they have advantages over copper wire cables because of their smaller size, lighter weight, lower transmission loss, higher band transmission, and the like.

A drawing furnace such as the one shown in FIG. 4 is usually used in a conventional optical fiber manufacturing step. Namely, an optical fiber preform 1 is inserted into a core tube 4 of a drawing furnace 3 and, while a leading end of the optical fiber preform 1 is softened upon heating with a heater 6 disposed about the outer periphery of the core tube 4 within a furnace body 5, the optical fiber preform 1 is drawn with a predetermined tension being applied thereto by a capstan (not depicted) or the like, whereby an optical fiber 2 having a desirable diameter is obtained.

In order to improve characteristics of thus obtained optical fiber, various manufacturing methods and apparatus have been proposed. For example, Japanese Patent Application Laid-Open No. HEI 4-198036 and Japanese Utility Model Application Laid-Open No. SHO 61-147233 disclose a heating furnace in which an annealing heater is provided in the upper part thereof, and a heating furnace equipped with a coil-shaped heater, respectively. Japanese Patent Publication No. HEI 6-2603 discloses an optical fiber manufacturing apparatus comprising a heat-treating furnace disposed between a drawing furnace and a coating unit, and a manufacturing method using the same; while stating that defects in the optical fiber can be reduced when the heat-treating furnace has such a temperature distribution that temperature becomes higher toward the optical fiber preform. Japanese Patent Publication No. HEI 8-9490 discloses a method in which an optical fiber preform is drawn such that its length and line speed of drawing an optical fiber satisfy a predetermined condition therebetween.

Meanwhile, demands have recently been increasing for optical fibers whose center core has a relative refractive index difference ($\Delta^+$) of at least 1% with respect to a cladding, such as dispersion-compensating fibers. Means for enhancing the relative refractive index difference of an optical fiber is exemplified by a method in which a core part is doped with a germanium compound such as germanium oxide ($GeO_2$), whereby the core part of thus obtained optical fiber is formed with a skeleton in which a silicon atom (Si) and a germanium atom are combined to each other by way of an oxygen atom.

However, when an optical fiber whose core part contains a germanium compound at a high concentration is made by the above-mentioned conventional method, defects such as non-bridging oxygen hole center may occur due to thermal dissociation of Si—O—Ge bonds in the drawing step, whereby the characteristic that the optical fiber does not increase transmission loss for light having a wavelength of 1.38 μm in a hydrogen atmosphere (hereinafter referred to as "hydrogen characteristic") becomes insufficient. The occurrence of non-bridging oxygen hole center is remarkably seen when the optical fiber is drawn from larger preform or with a higher line speed, whereby it has been very difficult to mass-produce efficiently and reliably optical fibers having a center core with a large relative refractive index difference.

For example, even when the heating furnaces disclosed in Japanese Patent Application Laid-Open No. HEI 4-198036, Japanese Utility Model Application Laid-Open No. SHO 61-147233, Japanese Patent Publication No. HEI 8-9490, and the like are used, Si—O—Ge bonds in thus drawn optical fiber cannot be prevented from thermally dissociating, whereby the resulting optical fiber may not be suitable for practical use in terms of the hydrogen characteristic. On the other hand, though the method disclosed in Japanese Patent Publication No. HEI 6-2603 reduces defects remaining in the optical fiber, the time during which the optical fiber stays within the heat-treating furnace and the length of the heat-treating furnace in the drawing direction are required to be very long, whereby it may not be sufficient yet in terms of production efficiency.

SUMMARY OF THE INVENTION

In view of the problems of prior art mentioned above, it is an object of the present invention to provide a method of drawing an optical fiber, which makes it possible to yield efficiently at a low cost an optical fiber in which the residual amount of lattice defects of a kind exhibiting a reactivity with respect to hydrogen molecules is sufficiently reduced, and characteristics are fully restrained from deteriorating in a hydrogen atmosphere, even when drawing an optical fiber whose center core has a large relative refractive index difference with respect to a cladding.

The inventors conducted diligent studies in order to achieve the above-mentioned object and, as a result, have found that, when drawing an optical fiber preform softened upon heating, the hydrogen characteristic of the resulting optical fiber varies depending on the glass cooling rate at the time when the optical fiber attains a temperature of 1800° C. Further diligent studies based on this finding have revealed that, when drawing an optical fiber preform softened upon heating, the residual amount of lattice defects of a kind exhibiting a reactivity with respect to hydrogen molecules is sufficiently reduced in the case where the glass cooling rate for the optical fiber is 4000° C./sec at the time when the optical fiber attains a temperature of 1800° C., so that characteristics are fully restrained from deteriorating in a hydrogen atmosphere, whereby the present invention is accomplished.

Namely, the method of manufacturing an optical fiber in accordance with the present invention comprises a step of yielding an optical fiber by drawing an optical fiber preform softened upon heating, wherein a temperature at which the optical fiber preform is softened is at least 1800° C., whereas the optical fiber preform or optical fiber has a glass cooling rate of 4000° C./sec or less when attaining a temperature of 1800° C.

In the present invention, when drawing an optical fiber preform softened upon heating, the glass cooling rate is 4000° C./sec or less when the optical fiber attains a temperature of 1800° C., whereby it becomes possible to yield efficiently and reliably an optical fiber in which the residual amount of lattice defects of a kind exhibiting a reactivity with respect to hydrogen molecules is sufficiently reduced, so that characteristics are fully restrained from deteriorating in a hydrogen atmosphere.

Though it is not clear why characteristics of an optical fiber in a hydrogen atmosphere are sufficiently restrained from deteriorating when the glass cooling rate satisfies the above-mentioned condition, the inventors presume that it is due to the fact that the thermal dissociation of Si—O—Ge bonds and the like is sufficiently suppressed and that the glass cooling rate in the necked-down lower part is fully lowered so as to sufficiently accelerate the recombination of thermally dissociated Si—O—Ge bonds and the like even when the thermal dissociation of Si—O—Ge occurred.

The effect that an optical fiber whose characteristics are fully restrained from deteriorating in a hydrogen atmosphere can be obtained efficiently and reliably, exhibited by the present invention, and the effect will not be obtained unless the glass cooling rate at the time when the optical fiber attains a temperature of 1800° C. is 4000° C./sec or lower. If the glass cooling rate at the time when the optical fiber attains other temperatures (e.g., about 1700° C.) is controlled here, efficiency and accuracy will become insufficient when manufacturing an optical fiber whose characteristics are fully restrained from deteriorating in a hydrogen atmosphere.

The method of manufacturing an optical fiber in accordance with the present invention exhibits excellent effects in particular when an optical fiber preform whose center core has a relative refractive index difference of at least 1% with respect to a cladding.

Preferably, in the method of manufacturing an optical fiber in accordance with the present invention, the optical fiber preform is drawn in a nitrogen atmosphere. If heating and drawing steps are carried out in the nitrogen atmosphere, the glass cooling rate can sufficiently be reduced even when the rate at which the optical fiber is drawn (line speed) is high, whereby efficiency and accuracy tend to improve when manufacturing an optical fiber whose characteristics are sufficiently restrained from deteriorating in a hydrogen atmosphere.

DESCRIPTION OF THE PREFERRED EMBODIMENTS

Figure 1:
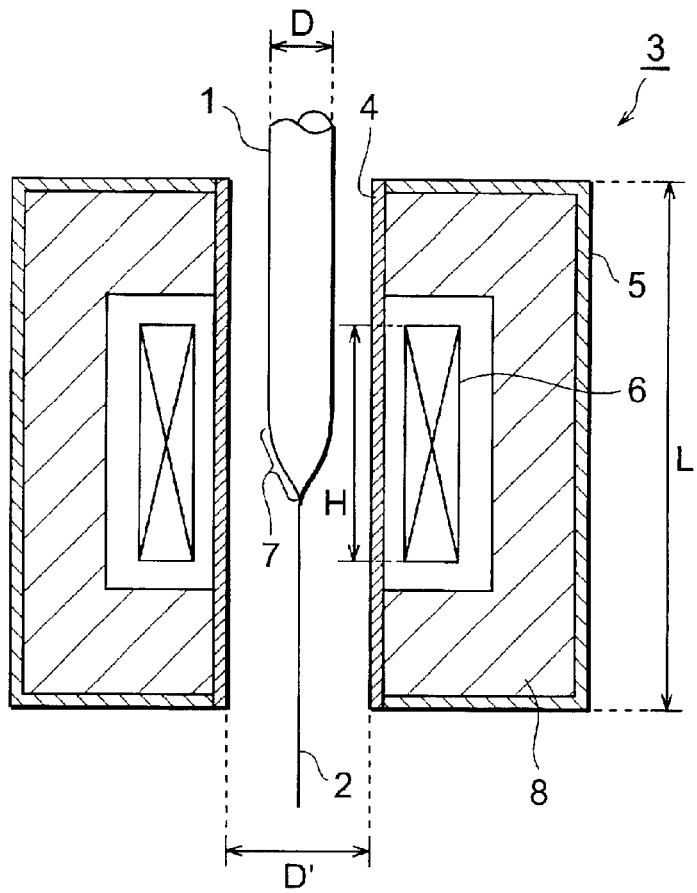
FIG. 1 is a schematic view showing an example of drawing furnace favorably employed in the present invention.

In the following, preferred embodiments of the present invention will be explained in detail with reference to the drawings when appropriate. In the drawings, parts identical or equivalent to each other will be referred to with numerals identical to each other.

FIG. 1 is a schematic view showing an example of drawing furnace favorably employed in the manufacturing method of the present invention. In FIG. 1, a drawing furnace 3 comprises a core tube 4 for inserting an optical fiber preform 1 therein, a furnace body 5 surrounding the core tube 4, and a heater 6 disposed about the outer periphery of the core tube 4 within the furnace body 5. The heater 6 is electrically connected to control means (not depicted), whereby the heat quantity of the heater 6 can be controlled by the control means. The gap between the core tube 4 and the furnace body 5 is filled with a heat insulator 8.

The inside of the drawing furnace 3 is usually held in an inert gas atmosphere of nitrogen ($N_2$), helium (He), argon (Ar), or the like. The atmosphere is preferably a nitrogen atmosphere in particular, since the glass cooling rate can sufficiently be lowered thereby even when the optical fiber line speed is high, whereby efficiency and accuracy tend to improve when manufacturing an optical fiber whose characteristics are fully restrained from deteriorating in a hydrogen atmosphere. The inert gas is caused to flow from the entrance to exit of the drawing furnace 3.

When manufacturing an optical fiber by use of thus configured drawing furnace 3, the optical fiber preform 1 inserted in the core tube 4 is initially heated by the heater 6 to at least 1800° C., desirably at least 1900° C. When the temperature is less than 1800° C., it becomes difficult to fully soften the optical fiber preform 1, whereby an optical fiber having a desirable diameter cannot be obtained efficiently and reliably. Desirably, the temperature at the time when heating the optical fiber preform 1 is 2050° C. or less. If the temperature exceeds the upper limit mentioned above, the optical fiber preform may soften in excess, whereby the transmission loss and hydrogen characteristic are likely to deteriorate.

Subsequently, the optical fiber preform 1 softened upon heating is drawn, whereby an optical fiber 2 is obtained.

Here, the inside of the drawing furnace 3 has a predetermined temperature distribution formed by the heating of the heater 6. The optical fiber preform 1 and optical fiber 2 within the drawing furnace 3 are cooled at a predetermined glass cooling rate from a necked-down part 7 toward the exit of the drawing furnace 3 while exhibiting a predetermined temperature distribution. Here, an optical fiber having an excellent hydrogen characteristic can be obtained efficiently and reliably if the glass cooling rate at the time when the optical fiber preform 1 or optical fiber 2 attains a temperature of 1800° C. is 4000° C./sec or less, preferably 2000° C./sec or less. Here, if the glass cooling rate exceeds 4000° C./sec, the thermal dissociation of Si—O—Ge bonds and the like will be likely to occur, and thermally dissociated Si—O—Ge bonds will be hard to recombine, whereby the hydrogen characteristic of the resulting optical fiber will be insufficient.

The glass cooling rate in the present invention can be obtained according to the temperature distribution curve (curve indicating the correlation between temperature and position) of the optical fiber preform 1 and optical fiber 2 within the drawing furnace 3 and the line speed. Namely, assuming that the gradient of the temperature distribution curve of the optical fiber preform 1 or optical fiber 2 at a position yielding a temperature of 1800° C. is—(dT/dx) [° C./m], whereas the line speed is v [m/sec], the glass cooling rate is expressed by (dT/dx)·v. Here, the temperature distribution curve of the optical fiber preform 1 or optical fiber 2 can be obtained in conformity to the method described in J. Appl. Phys., 4417-4422, 49 (8), August 1978, for example.

In the manufacturing method of the present invention, the glass cooling rate can be controlled so as to satisfy the above-mentioned condition by appropriately selecting parameters such as the pulling tension, the line speed, the length of the drawing furnace 3, the inner diameter of the core tube 4, and the like, which will be explained later.

Though appropriately selectable depending on preform structures such as the germanium doping amount in the core part, the aimed diameter of the optical fiber, the line speed, and the like, the pulling tension at the time of drawing an optical fiber preform is desirably at least 120 MPa, more desirably 160 to 280 MPa. When the pulling tension is less than 120 MPa, the hydrogen characteristic of the resulting optical fiber tends to deteriorate. When it exceeds 280 MPa, by contrast, the strength of the optical fiber decreases, so that the fiber break upon screening in later steps tends to increase.

Though appropriately selectable depending on the diameter of the optical fiber preform, the aimed diameter of the optical fiber, and the like, the line speed at the time of drawing the optical fiber preform 1 is preferably 100 to 800 m/min.

Though the length of the drawing furnace 3 and the inner diameter of the core tube 4 are appropriately selected depending on parameters such as the heating temperature at the time when softening the optical fiber preform 1 and the line speed, the glass cooling rate can be controlled so as to satisfy the above-mentioned condition, for example, if the drawing furnace 3 has a length of 300 to 700 mm whereas the core tube 4 has an inner diameter of 20 to 80 mm when the drawing is carried out at a line speed of 400 m/min.

Thus obtained optical fiber is usually taken up with a predetermined tension after its outer peripheral face is coated with a UV-curable resin or the like.

The method of manufacturing an optical fiber in accordance with the present invention having the configuration mentioned above is applicable to any of single-mode and multi-mode optical fibers. The manufacturing method of the present invention exhibits excellent effects in particular when manufacturing a silica type optical fiber whose center core has a relative refractive index difference of at least 1% with respect to a cladding. The amount of increase in transmission loss with respect to light having a wavelength of 1.38 μm when thus obtained optical fiber is held for 20 hours in an atmosphere of a mixed gas composed of hydrogen and nitrogen (with a hydrogen concentration of 1% by volume) at 80° C., for example, can be suppressed to 0.15 dB/km or less. Thus, the method of manufacturing an optical fiber in accordance with the present invention is quite useful in that a sufficiently high productivity and a sufficiently high hydrogen characteristic can be achieved at the same time, which has been quite difficult to achieve in the conventional manufacturing methods.

EXAMPLES

In the following, the present invention will further be explained specifically with reference to Examples and Comparative Examples, though the present invention is not restricted to the following Examples at all.

Figure 2:
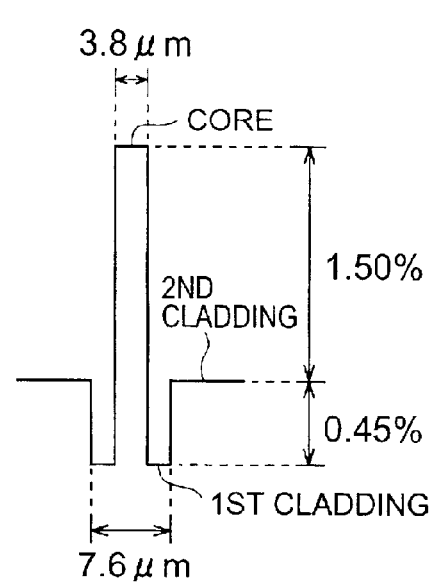
FIG. 2 is an explanatory view showing the refractive index distribution of an optical fiber preform used in Examples.

Each of the optical fiber preforms used in the following Examples and Comparative Examples includes a core doped with germanium oxide and a first cladding doped with fluorine, whereas its core and first and second claddings have the refractive index distribution shown in FIG. 2.

Example 1

An optical fiber preform having a diameter (D) of 36 mm was inserted into a core tube of a drawing furnace having the configuration shown in FIG. 1 in which the core tube had an inner diameter (D') of 45 mm, the furnace body had a length (L) of 250 mm in the drawing direction, and the heater had a length (H) of 130 mm in the drawing direction, and was drawn at a line speed of 100 m/min while being softened upon heating in a nitrogen atmosphere with the heater temperature being set at 1950° C., whereby an optical fiber having a diameter of 125 μm was obtained. Here, the glass cooling rate at the time when the optical fiber attained a temperature of 1800° C. was 87.41° C./sec.

Concerning thus obtained optical fiber, the amount of change in transmission loss of light having a wavelength of 1.38 μm ($\Delta\alpha_{1.38}$ [dB/km]) between before and after exposure to an atmosphere of a mixed gas composed of 1% by volume of hydrogen and 99% by volume of nitrogen at 80° C. for 20 hours was measured. Table 1 shows thus obtained results.

Examples 2 to 5

Optical fibers each having a diameter of 125 μm were prepared as in Example 1 except that the glass cooling rate at the time when the optical fibers attained a temperature of 1800° C. was changed as shown in Table 1, and $\Delta\alpha_{1.38}$ was measured. Table 1 shows thus obtained results.

Examples 6 to 8

Optical fibers each having a diameter of 125 μm were prepared as in Example 1 except that the line speed was 200 m/min and that the glass cooling rate at the time when the optical fibers attained a temperature of 1800° C. was changed as shown in Table 1, and $\Delta\alpha_{1.38}$ was measured. Table 1 shows thus obtained results.

TABLE 1

| | Line speed [m/min] | Glass cooling rate [° C./sec] | Δ α 1.38 [dB/km] |
|---|---|---|---|
| Example 1 | 100 | 87.41 | 0.000 |
| Example 2 | 100 | 69.96 | 0.010 |
| Example 3 | 100 | 666.8 | 0.150 |
| Example 4 | 100 | 896.0 | 0.160 |
| Example 5 | 100 | 1644 | 0.390 |
| Example 6 | 200 | 767.1 | 0.230 |
| Example 7 | 200 | 1363 | 0.320 |
| Example 8 | 200 | 3094 | 0.640 |

Example 9

An optical fiber preform having a diameter of 70 mm was inserted into a core tube of a drawing furnace having the configuration shown in FIG. 1 in which the core tube had an inner diameter of 90 mm, the furnace body had a length of 350 mm in the drawing direction, and the heater had a length of 130 mm in the drawing direction, and was drawn at a line speed of 100 m/min while being softened upon heating in a helium atmosphere with the heater temperature being set at 1950° C., whereby an optical fiber having a diameter of 125 μm was obtained. Here, the glass cooling rate at the time when the optical fiber attained a temperature of 1800° C. was 2592° C./sec.

Concerning thus obtained optical fiber, $\Delta\alpha_{1.38}$ [dB/km] was measured as in Example 1. Table 2 shows thus obtained results.

Example 10 and Comparative Example 1

Optical fibers each having a diameter of 125 μm were prepared as in Example 9 except that the glass cooling rate at the time when the optical fibers attained a temperature of 1800° C. was changed as shown in Table 2, and $\Delta\alpha_{1.38}$ was measured. Table 2 shows thus obtained results.

Example 11 and Comparative Examples 2 and 3

Optical fibers each having a diameter of 125 μm were prepared as in Example 9 except that the line speed was 150 m/min and that the glass cooling rate at the time when the optical fibers attained a temperature of 1800° C. was changed as shown in Table 2, and $\Delta\alpha_{1.38}$ was measured. Table 2 shows thus obtained results.

Example 12 and Comparative Examples 4 and 5

Optical fibers each having a diameter of 125 μm were prepared as in Example 9 except that the line speed was 200 m/min and that the glass cooling rate at the time when the optical fibers attained a temperature of 1800° C. was changed as shown in Table 2, and $\Delta\alpha_{1.38}$ was measured. Table 2 shows thus obtained results.

Comparative Examples 6 to 8

Optical fibers each having a diameter of 125 μm were prepared as in Example 9 except that the line speed was 250 m/min and that the glass cooling rate at the time when the optical fibers attained a temperature of 1800° C. was changed as shown in Table 2, and $\Delta\alpha_{1.38}$ was measured. Table 2 shows thus obtained results.

TABLE 2

|  | Line speed [m/min] | Glass cooling rate [° C./sec] | Δ α 1.38 [dB/km] |
| --- | --- | --- | --- |
| Example 9 | 100 | 2592 | 0.075 |
| Example 10 | 100 | 3634 | 0.160 |
| Example 11 | 150 | 2917 | 0.125 |
| Example 12 | 200 | 3029 | 0.100 |
| Comparative Example 1 | 100 | 5353 | 0.270 |
| Comparative Example 2 | 150 | 4222 | 0.240 |
| Comparative Example 3 | 150 | 6470 | 0.480 |
| Comparative Example 4 | 200 | 4492 | 0.320 |
| Comparative Example 5 | 200 | 7453 | 0.580 |
| Comparative Example 6 | 250 | 6140 | 0.310 |
| Comparative Example 7 | 250 | 6444 | 0.300 |
| Comparative Example 8 | 250 | 8421 | 0.660 |

As shown in Tables 1 and 2, it was verified that each of the optical fibers obtained in Examples 1 to 12 had sufficiently small $\Delta\alpha_{1.38}$ and a favorable hydrogen characteristic.

Figure 3:
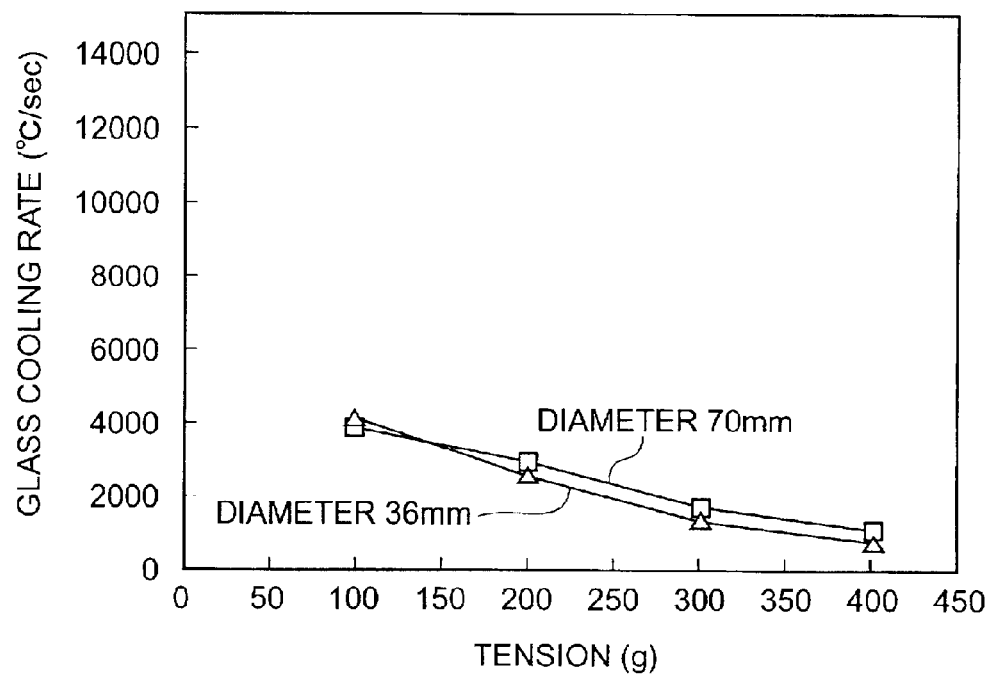
FIG. 3 is a graph showing the correlation between glass cooling rate and tension obtained in Examples.
Figure 4:
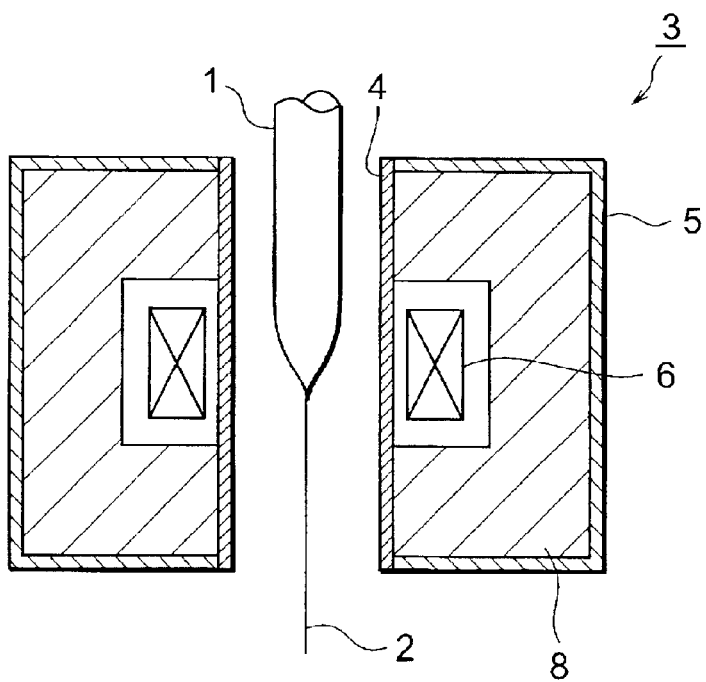
FIG. 4 is a schematic view showing an example of conventional optical fiber drawing furnace.

FIG. 3 shows the correlation between glass cooling rate and tension when drawing an optical fiber preform having a diameter of 36 mm or 70 mm while using nitrogen as an atmosphere gas. When nitrogen was used as an atmosphere gas, as shown in FIG. 3, it was possible for the glass cooling rate to fully decrease over a wide tension range, and it was easy for the glass cooling rate to become 4000° C./sec or less at 1800° C. even when the optical fiber preform was made with a larger diameter.

As explained in the foregoing, even when drawing an optical fiber whose center core has a large relative refractive index difference with respect to a cladding, the method of manufacturing an optical fiber in accordance with the present invention can yield efficiently at a low cost an optical fiber in which the residual amount of lattice defects of a kind exhibiting a reactivity with respect to hydrogen molecules is sufficiently reduced, and the deterioration of characteristics is fully suppressed in a hydrogen atmosphere.

What is claimed is:

1. A method of manufacturing an optical fiber comprising a step of yielding an optical fiber by drawing an optical fiber preform softened upon heating;

wherein a temperature at which said optical fiber preform is softened is at least 1800° C.;

said optical fiber preform or said optical fiber has a glass cooling rate of 4000° C./sec or less when attaining a temperature of 1800° C.;

said optical fiber preform has a center core exhibiting a relative refractive index difference of at least 1% with respect to a cladding; and a pulling tension at the time of drawing said optical fiber preform is not less than 120 MPa and not more than 280 MPa.

2. A method of manufacturing an optical fiber according to claim 1, wherein said optical fiber preform is drawn in a nitrogen atmosphere.

* * * * *